United States Patent
Smith et al.

[11] Patent Number: 6,049,668
[45] Date of Patent: Apr. 11, 2000

[54] METHOD AND APPARATUS FOR SUPPORTING MULTIPLE PROCESSOR-SPECIFIC CODE SEGMENTS IN A SINGLE EXECUTABLE

[75] Inventors: Kevin B. Smith, Hillsboro; Clark F. Nelson, Portland, both of Oreg.; Seth Abraham, Gilbert, Ariz.

[73] Assignee: Intel Corporation, Santa Clara, Calif.

[21] Appl. No.: 09/059,601

[22] Filed: Apr. 13, 1998

[51] Int. Cl.[7] .................................................. G06F 9/45
[52] U.S. Cl. ................................. 395/705; 395/500.48
[58] Field of Search .................................. 395/701–710, 395/712, 500, 500.44, 500.47, 500.48; 709/300, 303, 305; 713/1, 100; 712/209, 227

[56] References Cited

U.S. PATENT DOCUMENTS

| | | | |
|---|---|---|---|
| 5,604,905 | 2/1997 | Tevanian et al. | 395/706 |
| 5,659,751 | 8/1997 | Heninger | 395/685 |
| 5,696,974 | 12/1997 | Agrawal et al. | 395/709 |
| 5,774,726 | 6/1998 | Ahmed | 395/705 |
| 5,835,699 | 11/1998 | Kimura | 395/704 |
| 5,835,773 | 11/1998 | Dunn | 395/705 |
| 5,835,775 | 11/1998 | Washington et al. | 395/706 |

*Primary Examiner*—Tariq R. Hafiz
*Assistant Examiner*—Kakali Chaki
*Attorney, Agent, or Firm*—Blakely, Sokoloff, Taylor & Zafman LLP

[57] ABSTRACT

A computer-implemented method identifies a code segment which is to be customized to a plurality of different processor types. The method generates object code for the code segment, including generating a plurality of sections for the code segment, each of the plurality of sections being object code for the code segment customized for one of the plurality of different processor types, and generating a control section that causes a selected one of the plurality of sections to be called during execution of the object code in accordance with an executing processor's processor type.

18 Claims, 6 Drawing Sheets

200

208

201 — cpu_specific (pentium_ii))
205 { print_cpu (void)
{       printf("Pentium® II processor\n");
}

221 — cpu_specific (pentium_pro))
225 { print_cpu (void)
{       printf("Pentium® Pro processor\n");
}

241 — cpu_specific (pentium_mmx))
245 { print_cpu (void)
{       printf("Pentium® processor with MMX™ technology\n");
}

261 — cpu_specific (pentium))
265 { print_cpu (void)
{       printf("Pentium® processor\n");
}

281 — cpu_dispatch (pentium_ii, pentium_pro, pentium_mmx, pentium)
287 { print_cpu (void)
{
}

```
402 ~  test  DWORD PTR_intel_cpu_indicator, -16
404 ~  jne   _print_cpu$E
       test  DWORD PTR_intel_cpu_indicator, -8
       jne   _print_cpu$D
       test  DWORD PTR_intel_cpu_indicator, -12
       jne   _print_cpu$C
       test  DWORD PTR_intel_cpu_indicator, -2
       jne   _print_cpu$B
412 ~  test  DWORD PTR_intel_cpu_indicator, -1
414 ~  jne   __intel_cpu_dispatch_fail
416 ~  call  __intel_cpu_indicator_init
418 ~  jmp   $B5$1
```

FIG. 4

METHOD AND APPARATUS FOR SUPPORTING MULTIPLE PROCESSOR-SPECIFIC CODE SEGMENTS IN A SINGLE EXECUTABLE

BACKGROUND OF THE INVENTION

1. Field of the Invention

The present invention pertains to compilers and software programming. More particularly, this invention relates to supporting multiple processor-specific code segments in a single executable.

2. Background

Modem computer systems can have any of a wide range and variety of configurations. One important component of a computer system is the processor, also referred to as the central processing unit (CPU). The processor executes instructions from a software program, a process referred to as "running" the program. Although typically all processors perform this basic task, a wide variety of different processors are available from a number of different manufacturers. These different processors, especially those from different manufacturers, have different internal designs, also referred to as the processor "architecture", and thus operate in different ways. Although the results from running a program on two different processors are typically the same, the way in which the processor obtains the result, as well as its speed, typically differ.

Many conventional processors, such as the Pentium® Pro processor and Pentium® processor with MMX™ technology (both available from Intel Corporation of Santa Clara, Calif.), are based on an architecture referred to as "x86". Software programs can be written which are executable by any x86-compatible processor. However, various changes can also be made to a software program in order to allow it to be executed faster by a particular processor type. By way of example, a Pentium® processor with MMX™ technology is capable of executing additional instructions, i.e., those associated with the MMX™ technology, which a Pentium® Pro processor is not capable of executing. Given the advantages of using such instructions, it would be beneficial to provide a way for a programmer to include code customized to both the Pentium® processor with MMX™ technology and the Pentium® Pro processor in the same program.

However, a software programmer also typically wants his or her code to be executable by as many processors as possible, thereby allowing a greater share of the market to purchase his or her product. This desire, then, is balanced against the programmer's desire to write code that works efficiently and makes the best use of the processor which is executing it. One way to do so is to write a separate program for each possible processor which might execute the program. However, such a solution is problemsome in that it is time-intensive and costly, often resulting in a large amount of unnecessary duplication.

Another solution is to write a single program which includes different routines or functions designed to take advantage of the various capabilities of the processors which may run the program. However, one problem with this solution is that most programming languages do not allow multiple functions to have the same function name. Thus, the programmer must give the different functions for the different processors different names and correctly manage these different names throughout the rest of the program. This can be particularly difficult due to the requirement that all portions of the code must correctly identify the different functions by their different names.

Thus, a need exists for an improved way to customize programs for specific processors.

SUMMARY OF THE INVENTION

A computer-implemented method is disclosed which identifies a code segment which is to be customized to a plurality of different processor types. The method generates object code for the code segment, including generating a plurality of sections for the code segment, each of the plurality of sections being object code for the code segment customized for one of the plurality of different processor types, and generating a control section that causes a selected one of the plurality of sections to be called during execution of the object code in accordance with an executing processor's processor type.

Another computer-implemented method is disclosed which identifies a plurality of code segments of a program each having a same identifier. The method generates object code for the program, including generating a plurality of sections each corresponding to one of the plurality of code segments, and generating a control section that causes a selected one of the plurality of sections to be called during execution of the object code in accordance with an executing processor's processor type.

BRIEF DESCRIPTION OF THE DRAWINGS

The present invention is illustrated by way of example and not limitation in the figures of the accompanying drawings, in which like references indicate similar elements and in which:

FIG. 2 illustrates multiple code segments incorporating the processor-specific and dispatch constructs according to one embodiment of the present invention;

FIG. 4 illustrates sample source code generated according to one embodiment of the present invention;

DETAILED DESCRIPTION

Figure 1:
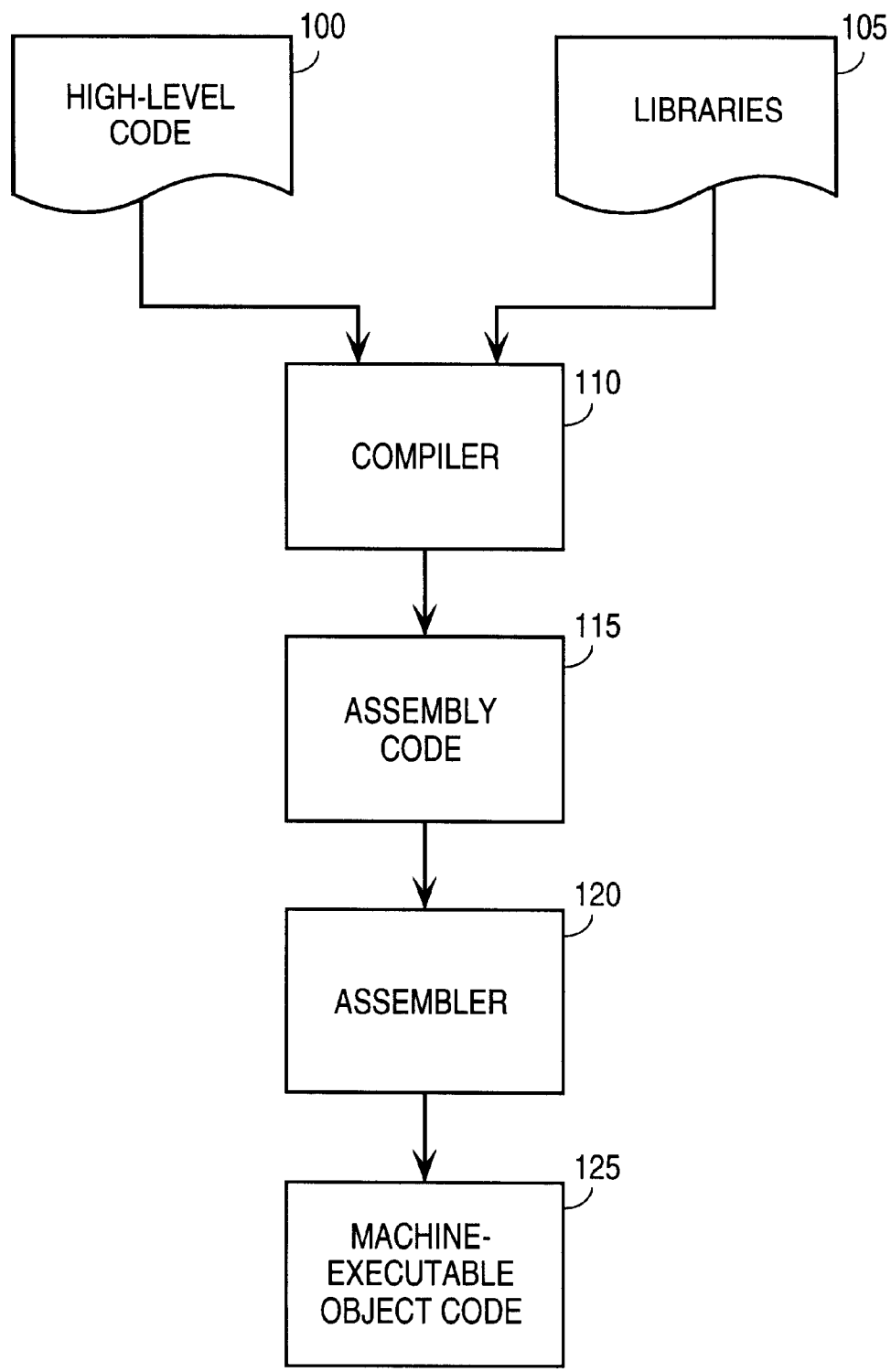
FIG. 1 illustrates the generation of machine executable code according to one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Modem programmers typically write programs in what are referred to as "high-level" programming languages. Examples of such high-level programming languages include C, C++, PASCAL, and Fortran. High-level programming languages make it easier for the programmer to write his or her code, however, they also must be converted into a form which can be interpreted by a processor in order for it to run the program. The form of a program which can be interpreted by a processor is typically referred to as "object code".

The present invention allows a programmer to create multiple code segments with the same identifier but different processor-specific instructions. These code segments are typically a "function" or "procedure" of the high-level programming language in the illustrated embodiment, but can be larger or smaller blocks of code. As used herein, "code segment" refers to one or more software instructions or statements. The code segment identifiers are typically the function or procedure name, but different identifiers can be used in alternate embodiments.

Thus, a programmer is able to customize different code segments, all with the same identifier, for different processor types. The object code corresponding to a particular one of these different code segments is then executed when the program runs, with the particular one of the different code segments being based on the type of processor which is running the program.

FIG. 1 illustrates the generation of machine executable code according to one embodiment of the present invention. High-level code 100 is coded or code generated from an application generator in a high-level programming language and is input to a compiler 110. Additional functions and procedures from libraries 105 may also be used by compiler 110 in compiling high-level code 100. Such additional functions are typically identified within the high-level code 100 and are typically general-purpose routines (for example, input/output (I/O) routines) which many programs will use. It is to be appreciated that although the present invention is discussed with reference to the high-level code 100, it may also be used with the code in the libraries 105.

Compiler 110 generates assembly code 115 from high-level code 100 and possibly libraries 105. Assembly code 115 provides a more human-readable version of the architectural- or processor-dependent object code, discussed below, and is also referred to as "assembly language". Assembly code 115 can be thought of as a mid-level programming language in relation to the high-level languages discussed above. The assembly code 115 can optionally be saved by compiler 110 as a separate file during the compilation process. Some compilers 110 make at least two or three "passes" through the high-level code 100 when creating the assembly code 115. Various customizations may also be made by compiler 110 in generating the assembly code 115 during these passes. The customizations are compiler-specific and conventionally have been identified by the programmer.

Assembly code 115 is input to an assembler 120. Assembler 120 converts the assembly code 115 into machine-executable object code 125. Object code 125 is a stream of binary values which can be executed by a processor. Object code 125 is also referred to as an "executable".

Except for the incorporation of the teachings of the present invention, compiler 110 and assembler 120 are intended to represent a wide range of compilers and assemblers well-known to those skilled in the art.

In the illustrated embodiment, compiler 110 and assembler 120 are implemented in software.

In the illustrated embodiment, two "constructs" are added to the high-level programming language in order to provide support for multiple code segments with the same identifier. These constructs can be incorporated into the programming language in any of a wide variety of conventional manners, including making the constructs "extensions" to a pre-existing language as discussed in more detail below. The first construct is a "processor-specific" construct which identifies a function as being specific to a particular processor type. The syntax of this processor-specific construct is:

cpu_specific (cpu_specifier) function_definition where the "function_definition" is the particular function being written by the programmer and the "cpu_specifier" is an identifier of a particular processor type for that particular function. The processor type refers to a particular processor architecture. Examples of processor types that can be supported by one implementation of the present invention are listed below in Table I. Although specific examples are listed in Table I, it should be noted that additional processor types and cpu_specifiers can be used with the present invention, including future processor types.

TABLE 1

| cpu_specifier | Processor Type |
|---|---|
| pentium_ii | Pentium ® II processor |
| pentium_pro | Pentium ® Pro processor |
| pentium_mmx | Pentium ® processor with MMX ™ techenology |
| pentium | Pentium ® processor |
| generic | A "generic" processor, other than one of the Pentium ® processor family or Pentium ® Pro processor family. |

The second construct is a "dispatch" construct which is used during compilation to identify the processor-specific constructs and the different processor types to which they correspond. The syntax of this dispatch construct is:

cpu_dispatch (cpu_specifier [,cpu_specifier [ . . . ]]) empty_function_definition The "empty_function_definition" is an empty_function (no code) having the same name as the function_definition. Multiple cpu_specifier identifiers may be included in the cpu_dispatch construct, one for each cpu_specific construct for the function_definition.

According to one embodiment of the present invention, the cpu_specific and cpu_dispatch constructs are implemented as an "extension" to the C and C++ programming languages. Although these extension constructs are not part of the original programming language, they can be added to the language and used as if they were a part of the original language, such as by using the Microsoft™"__declspec" keyword. The "__declspec" keyword can be used to identify a function as an extension to the language. According to one implementation, the syntax for doing so is as follows:

__declspec (cpu_specific (cpu_specifier))function_definition
    __declspec (cpu_dispatch (cpu_specifier [, cpu_specifier
    [ . . . ]])) empty_function_definition The cpu_specifier, function_definition, and empty_function_definition are the same as discussed above.

FIG. 2 illustrates multiple code segments written in the C++ programming language incorporating the cpu_specific and cpu_dispatch constructs. As illustrated, software program 200 includes a first cpu_specific construct 201 which identifies a print_cpu function 205 customized to the Pentium® II processor (as indicated by cpu_specifier identifier 208). Similarly, program 200 also includes a second cpu_specific construct 221 which identifies a print_cpu function 225 customized to the Pentium® Pro processor, a third cpu_specific construct 241 which identifies a print_cpu function 245 customized to the Pentium® processor with MMX™ technology, and a fourth print_cpu construct 261 which identifies a print_cpu function 265 customized to the Pentium® processor. As illustrated, each of the four print_cpu functions has the same function name but different instructions which are customized to particular processor types.

Software program 200 also includes a cpu_dispatch construct 281. The cpu_dispatch construct 281 includes a list of identifiers which includes each of the processor types listed in the cpu_specific constructs 201, 221, 241, and 261. The cpu_dispatch construct 281 identifies a print_cpu function 287, the name of which is the same as the function names in the cpu_specific constructs 201, 221, 241, and 261. The cpu_specific constructs and the cpu_dispatch constructs allow the present invention to be used multiple times within the same program on different function names. Thus, other processor-specific functions (not shown) can be included along with constructs 201, 221, 241, 261, and 281 in program 200.

It should be noted that the cpu_specific functions 201, 221, 241, and 261 of FIG. 2 may be located adjacent one another as illustrated in program 200, or alternatively may be distributed throughout different locations of program 200.

Figure 3:
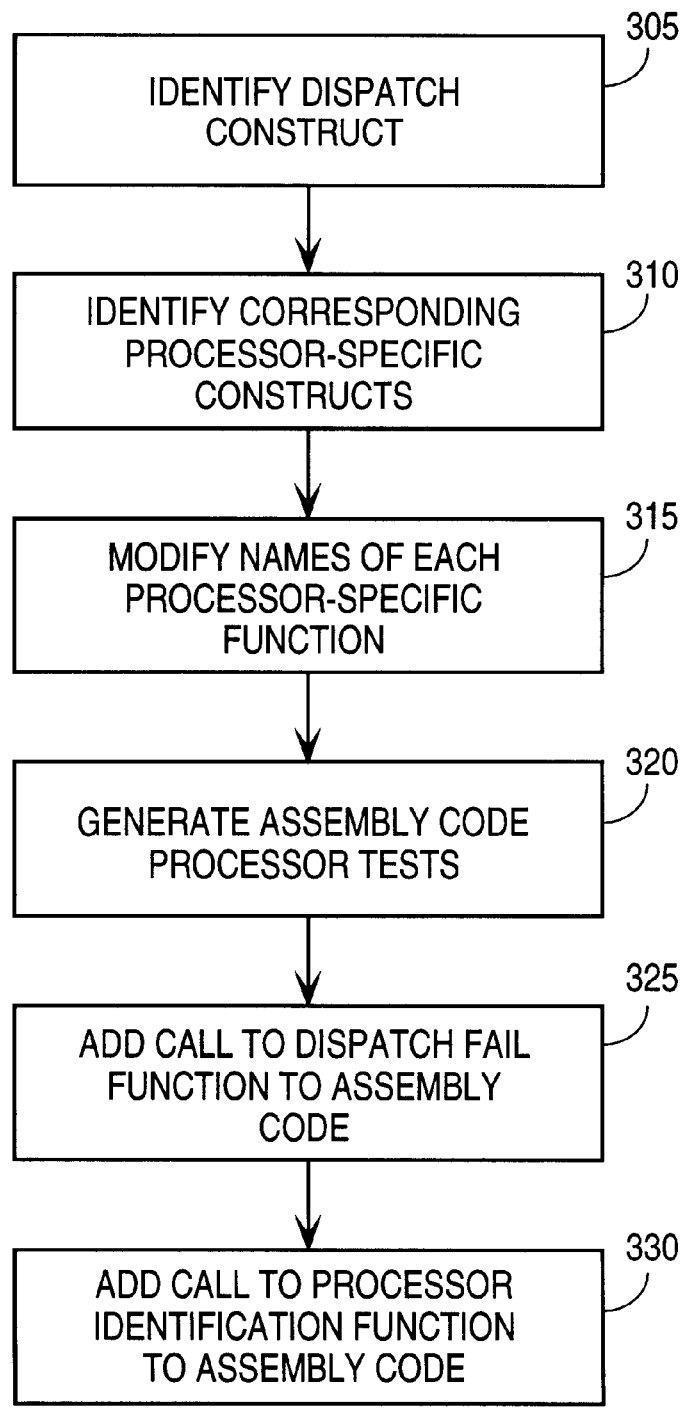
FIG. 3 is a flowchart illustrating the steps followed in compiling high-level language according to one embodiment of the present invention.

FIG. 3 is a flowchart illustrating the steps followed in compiling the high-level language according to one embodiment of the present invention. During compilation, a dispatch construct is first identified, step 305. In the illustrated embodiment, this is the cpu_dispatch construct 281 of FIG. 2. Processor-specific constructs corresponding to the dispatch construct are then identified, step 310. In the illustrated embodiment, the empty_function_definition of the cpu_dispatch construct is the same name as the function_definition of the cpu_specific construct. Thus, the compiler is able to search through the high-level program to identify each of the different constructs which correspond to the dispatch construct, which are constructs 201, 221, 241, and 261 of FIG. 2.

The compiler then modifies the names of each of the processor-specific functions, step 315. This is done in order for the assembler to distinguish between each of the different functions. However, this step is done by the compiler and is not visible to the high-level language programmer, who views each of the functions as having the same name. In one embodiment, this is accomplished by a "name mangling" algorithm, which modifies function names as necessary during compilation. In this embodiment, the compiler is pre-programmed with possible processor types and an appropriate modification for each function name based on processor type. By way of example, the characters "$B" can be added to the end of a function name for a Pentium® processor type, while the characters "$E" can be added to the end of a function name for a Pentium® II processor type. In the illustrated embodiment, at least one character which is an invalid character for a finction name in the high-level language is added to the function name in the object code. This use of an invalid high-level language character in the object code ensures that the compiler does not modify the name to be the same as another function name created by the programmer.

The compiler then generates multiple source code tests corresponding to the dispatch construct, step 320. These multiple source code tests access an intel_cpu_indicator variable to identify the processor type. According to one embodiment of the present invention, the intel_cpu_indicator is a bit vector which encodes the processor type. The bit vectors and their corresponding processor types according to one embodiment of the present invention are illustrated in Table II below. Alternate embodiments can include a lesser or greater number of bits.

TABLE II

| Bit Vector | Processor Type |
|---|---|
| 00000000000000000000000000000001 | generic |
| 00000000000000000000000000000010 | Pentium ® processor |
| 00000000000000000000000000000100 | Pentium ® Pro processor |
| 00000000000000000000000000001000 | Pentium ® processor with MM ™ technology |
| 00000000000000000000000000010000 | Pentium ® II processor |

The compiler then adds a dispatch fail instruction to the assembly code, step 325. This dispatch fail instruction identifies a course of action to take when the processor type is not identifiable. In the illustrated embodiment, the dispatch fail instruction is a jump instruction to a dispatch fail function which is a library function that is programmer-replaceable. Thus, the programmer is able to display, for example, an error message indicating the program cannot be executed by the current processor, or alternatively provide a "bare minimum" amount of code which will allow the program to continue running.

The compiler then adds a processor identification instruction to the assembly code, step 330. The processor identification instruction identifies a course of action to take when the processor type has not yet been identified. In the illustrated embodiment, the processor identification instruction is a call to a cpu_indicator initialization function which loads the processor type information into the intel_cpu_indicator variable. Thus, once the processor type is loaded into the intel_cpu_indicator variable, the code will be able to access and identify the processor type.

The cpu_indicator initialization function obtains the processor type information using the CPUID instruction, supported by many Intel processors. The CPUID instruction identifies the processor family (e.g., Pentium® processor family or Pentium® Pro processor family), as well as whether the processor is enabled with MMX™ technology (e.g., the Pentium® processor with MMX™ technology or the Pentium® II processor), thereby indicating whether the processor type is a Pentium® processor, Pentium® II processor, Pentium® Pro processor, or Pentium® processor with MMX™ technology. Additional information may also be returned by the CPUID instruction, such as the stepping of the processor. This additional information can be used in alternate embodiments of the present invention to distinguish between different processor types. By way of example, a particular stepping of a processor may have a "bug" which is not present in subsequent steppings, and thus different code segments can be written customized to the different steppings.

During initialization of the program, the intel cpu_ indicator variable is initialized to zero. The processor type is then stored in the intel_cpu_indicator variable when the cpu_indicator initialization function is called. Thus, in the illustrated embodiment the cpu_indicator initialization function need not be called more than once during program execution.

FIG. 4 illustrates sample assembly code generated according to one embodiment of the present invention by a compiler from the program code 200 of FIG. 2. The assembly code provides a series of tests for processor types. The tests are performed during execution by checking a value stored at the memory location identified by _intel_cpu_ indicator (i.e., the intel_cpu_indicator variable). If the test succeeds, then the code jumps to the appropriate address for the beginning of the function for the identified processor type. However, if a test fails, then the code checks for another processor type.

As illustrated, the code initially checks with test 402 whether the processor type is a Pentium® II processor. If the processor type is a Pentium® II processor, then the jump instruction 404 transfers program execution to the memory location indicated by _print_cpu$E, which is the memory address of the section of code for the print_cpu function customized to the Pentium® II processor (function 205 of FIG. 2). Similar tests are made for the Pentium® Pro processor, Pentium® processor with MMX™ technology, and the Pentium® processor.

The final test 412 checks whether there is a non-zero value stored in the intel_cpu_indicator variable. If there is a non-zero value, then jump instruction 414 jumps program execution to a dispatch fail function located at the address intel_cpu_dispatch_fail. However, if there is not a non-zero value stored in the intel_cpu_indicator variable, then a call 416 to the cpu_indicator initialization function located at the address intel cpu_indicator is made. Upon return from the cpu_indicator initialization function, the program execution continues in a jump to test instruction 402, thereby repeating the process. However, now that the intel_cpu_indicator variable has been initialized, one of the tests for processor type will be successful, indicating either a particular processor type or a dispatch fail.

In the illustrated embodiment, the compiler orders the test instructions so that the program execution jumps to the most "advanced" function (that is, the function customized to the most advanced processor architecture) which can be executed by the processor executing the program. By way of example, if two customized functions are generated, one for a Pentium® processor and one for a Pentium® processor with MMX™ technology, and if the processor executing the program is a Pentium® II processor, then the test for the Pentium® processor with MMX™ technology is successful, thereby causing program execution to jump to the function customized for the Pentium® processor with MMX™ technology.

Also in the illustrated embodiment, the compiler orders the test instructions in the assembly code such that the highest performance processor is tested for first. This reduces the overhead (the additional tests) of the present invention for higher performance processors. However, alternate embodiments can using different orderings. In one such alternate embodiment, the test instructions are ordered so that the most likely processor to be executing the program is tested for first.

The assembly code illustrated in FIG. 4 is a sample of assembly code which is generated according to one embodiment of the present invention. Alternate embodiments can generate different assembly code. By way of example, the ordering of the test instructions can be changed, the test values (−16, −8, −12, and −2) can be changed, different types of testing or comparing instructions can be used, etc.

For ease of explanation, the present invention has been described in terms of the assembly code generated by the compiler. Those skilled in the art will appreciate that this assembly code is subsequently converted to object code which is executed by the processor.

Figure 5:
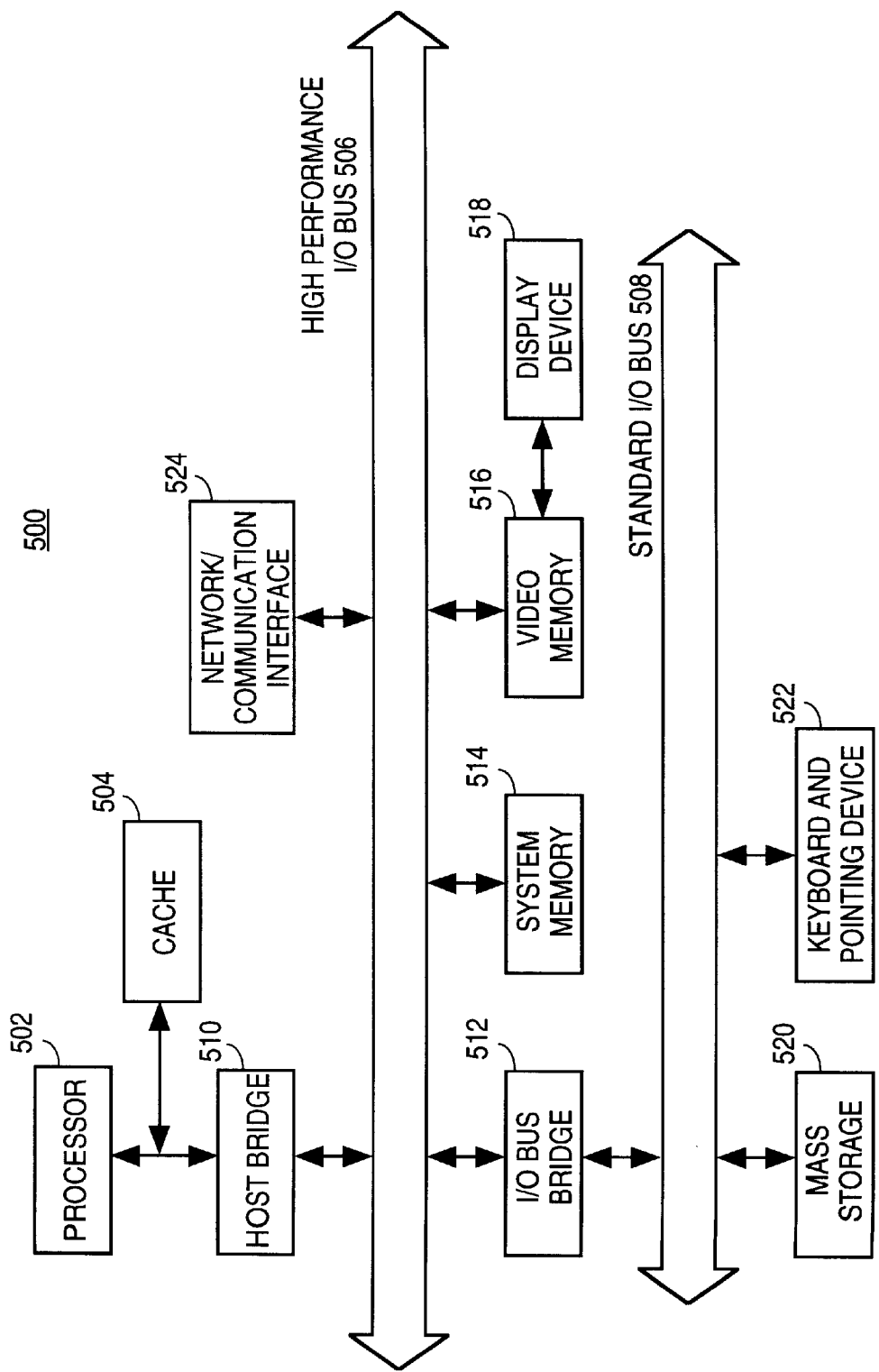
FIG. 5 illustrates an example hardware system suitable for use with one embodiment of the present invention.

FIG. 5 illustrates an example hardware system suitable for use with one embodiment of the present invention. Hardware system 500 includes processor 502 and cache memory 504 coupled to each other as shown. Additionally, hardware system 500 includes high performance input/output (I/O) bus 506 and standard I/O bus 508. Host bridge 510 couples processor 502 to high performance I/O bus 506, whereas I/O bus bridge 512 couples the two buses 506 and 508 to each other. Coupled to bus 506 are network/communication interface 524, system memory 514, and video memory 516. In turn, display device 518 is coupled to video memory 516. Coupled to bus 508 is mass storage 520, keyboard and pointing device 522, and I/O ports 526. Collectively, these elements are intended to represent a broad category of hardware systems, including but not limited to general purpose computer systems based on the Pentium® processor, Pentium® Pro processor, Pentium® II processor, or Pentium® processor with MMX™ technology, available from Intel Corporation of Santa Clara, Calif.

These elements 502–524 perform their conventional functions known in the art. In particular, network/communication interface 524 is used to provide communication between system 500 and any of a wide range of conventional networks, such as an Ethernet, token ring, the Internet, etc. It is to be appreciated that the circuitry of interface 524 is dependent on the type of network the system 500 is being coupled to.

Mass storage 520 is used to provide permanent storage for the data and programming instructions to implement the above described functions, whereas system memory 514 is used to provide temporary storage for the data and programming instructions when executed by processor 502. I/O ports 526 are one or more serial and/or parallel communication ports used to provide communication between additional peripheral devices which may be coupled to hardware system 500.

It is to be appreciated that various components of hardware system 500 may be rearranged. For example, cache 504 may be on-chip with processor 502. Alternatively, cache 504 and processor 502 may be packed together as a "processor module", with processor 502 being referred to as the "processor core". Furthermore, certain implementations of the present invention may not require nor include all of the above components. For example, mass storage 520, keyboard and pointing device 522, and/or display device 518 and video memory 516 may not be included in system 500. Additionally, the peripheral devices shown coupled to standard I/O bus 508 may be coupled to high performance I/O bus 506; in addition, in some implementations only a single bus may exist with the components of hardware system 500 being coupled to the single bus. Furthermore, additional components may be included in system 500, such as additional processors, storage devices, or memories.

In one embodiment, the compiling and assembling of instructions according to the present invention is implemented as a series of software routines run by hardware system 500 of FIG. 5. In this embodiment, compiler 110 and assembler 120 of FIG. 1 are each implemented as a series of software routines. These software routines comprise a plurality or series of instructions to be executed by a processor in a hardware system, such as processor 502 of FIG. 5. Initially, the series of instructions are stored on a storage device, such as mass storage 520. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 524. The instructions are copied from the storage device, such as mass storage 520, into memory 514 and then accessed and executed by processor 502. In one implementation, these software routines are written in the C++ programming language. It is to be appreciated, however, that these routines may be implemented in any of a wide variety of programming languages.

Figure 6:
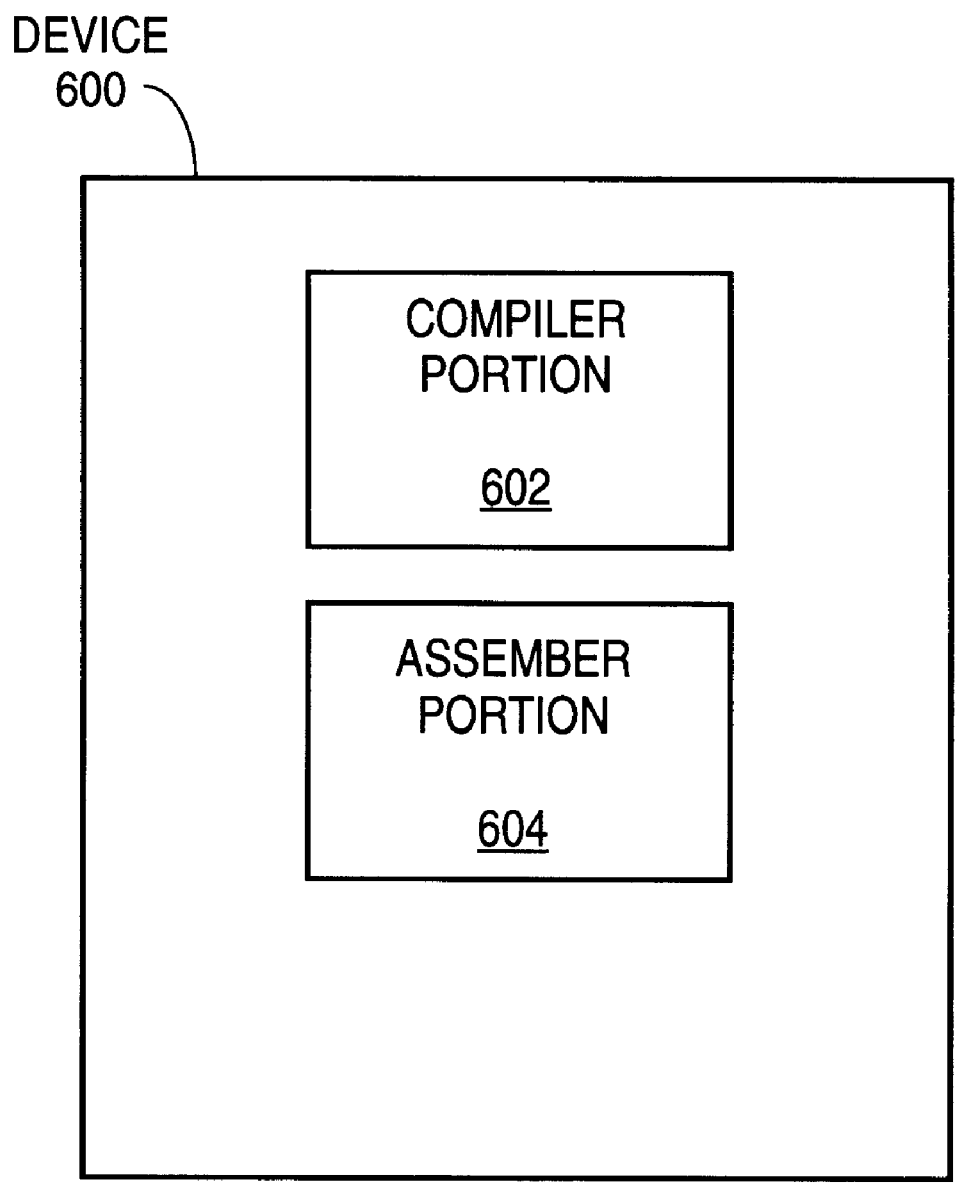
FIG. 6 is a block diagram illustrating a device on which one embodiment of the present invention can be implemented.

FIG. 6 is a block diagram illustrating a device on which one embodiment of the present invention can be implemented. The device 600 is meant to represent a wide variety of devices in which the present invention can be implemented, including conventional storage media (such as a floppy disk, hard disk, or a random access memory), as well as discrete hardware or firmware. The device 600 includes a compiler portion 602 and an assembler portion 604. Compiler portion 602 includes the instructions, to be executed by a processor, for carrying out the process of compiling a high-level language into assembly code, whereas assembler portion 604 includes the instructions, to be executed by a processor, for carrying out the process of converting the assembly code into object code.

It should be noted that, although specific syntax for the present invention is discussed above, alternate embodiments can use variations on this syntax. According to one such alternate embodiment, the empty_function_definition of the cpu_dispatch construct is not empty, rather, it contains the code the user wishes for the compiler to make processor-specific. The compiler generates a different piece of object code for each of the different processors, based on the code of the cpu_dispatch construct. Each of these different pieces of code are optimized by the compiler for the particular processor types (e.g., by setting of specific compiler switches).

Various examples of processor types are given in the discussions above. Although different Intel-architecture processors are discussed, the present invention may also be used to customize code to different manufacturers or different processor types of another manufacturer.

Additionally, the present invention is discussed above with reference to the C or C++ programming language. In alternate embodiments, the processor-specific and dispatch constructs are provided in other programming languages, such as PASCAL, Fortran, Java, etc.

Furthermore, other modifications can be made by compiler 110 to further enhance the processor-specific customization of the present invention. In an alternate embodiment, one such customization is the setting and clearing of particular processor optimization switches. In this embodiment, when compiling the cpu_dispatch and cpu_specific constructs, additional switches or compiler options are set by the compiler which correspond to the processor type of the function being compiled (as identified by the cpu_specific construct). These additional switches and/or compiler options cause the compiler to further customize the source code generated for the particular processor type.

According to another alternate embodiment, the compiler automatically and dynamically customizes the source code for particular processor types. In this alternate embodiment, the compiler analyzes the source code on a code segment by code segment basis to determine whether a performance advantage can be obtained over the non-customized version of the function by customizing the function to a particular processor type. If greater than a threshold performance advantage can be obtained, then the compiler compiles the source code customized for particular processor types in addition to compiling the source code for a "generic" processor. Otherwise, a "generic", non-processor-specific compilation is performed.

Thus, the present invention supports multiple processor-specific code segments in a single executable. The present invention allows a programmer to write multiple different code segments, each customized to a particular type of processor, yet each advantageously having the same identifier. Additionally, the present invention also allows a programmer to write a single code segment and advantageously have that single code segment customized to different processor types automatically by the compiler. Subsequently, during program execution, the proper customized code segment is advantageously selected based on the processor which is executing the program.

Thus, a method and apparatus for supporting multiple processor-specific code segments in a single executable has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:
   identifying a plurality of code segments of a program each having a same identifier, said identifying further comprising identifying a plurality of functions each having a same function name and each being customized to a different processor type; and
   generating object code for the program, including generating a plurality of sections each corresponding to one of said plurality of code segments, and generating a control section that causes a selected one of said plurality of sections to be called during execution of said object code in accordance with an executing processor's processor type.

2. The method of claim 1, wherein the generating comprises modifying the identifiers of each of the plurality of code segments.

3. The method of claim 1, wherein the generating comprises creating a plurality of tests, one for each of a plurality of different processor types.

4. The method of claim 1, wherein the object code causes a dispatch fail function to be executed if no section of the object code corresponds to a processor type of the processor which is executing the object code.

5. The method of claim 1, wherein the processor type comprises a particular processor architecture.

6. A machine-readable medium having stored thereon a plurality of instructions, designed to be executed by a processor, for implementing a function for, identifying a plurality of code segments of a program each having a same identifier, said identifying further comprising identifying a plurality of functions each having a same function name and each being customized to a different processor type; and generating object code for said program, including generating a plurality of sections each corresponding to one of said plurality of code segments, and generating a control section that causes a selected one of said plurality of sections to be called during execution of said object code in accordance with an executing processor's processor type.

7. The machine-readable medium of claim 6, wherein the plurality of instructions for implementing a function for generating comprises a plurality of instructions for implementing a function for modifying the identifiers of each of the plurality of code segments.

8. The machine-readable medium of claim 6, wherein the plurality of instructions for implementing a function for generating comprises a plurality of instructions for implementing a function for creating a plurality of tests, one for each of a plurality of different processor types.

9. The machine-readable medium of claim 6, wherein the object code causes a dispatch fail function to be executed if no section of the object code corresponds to a processor type of the processor which is executing the object code.

10. A method comprising:

identifying a code segment which is to be customized to a plurality of different processor types; and generating object code for said code segment, including generating a plurality of sections for said code segment, each of said plurality of sections being object code for said code segment customized for one of said plurality of different processor types, setting one or more compiler switches specific to a processor type during generation of a section of said plurality of sections for said processor type, and generating a control section that causes a selected one of said plurality of sections to be called during execution of said object code in accordance with an executing processor's processor type.

11. The method of claim 10, wherein the identifying comprises identifying a plurality of functions each having a same function name and each being customized to a different one of the plurality of different processor types.

12. The method of claim 10, wherein the identifying comprises identifying a code segment associated with a dispatch construct.

13. The method of claim 12, further comprising identifying a plurality of additional code segments associated with a plurality of processor-specific constructs corresponding to the dispatch construct.

14. The method of claim 10, wherein each of the plurality of different processor types is a different processor architecture.

15. A machine-readable medium having stored thereon a plurality of instructions, designed to be executed by a processor, for implementing a function for, identifying a code segment which is to be customized to a plurality of different processor types, and generating object code for the code segment, including generating a plurality of sections for said code segment, each of said plurality of sections being object code for said code segment customized for one of said plurality of different processor types, setting one or more compiler switches specific to a processor type during generation of a section of the plurality of sections for said processor type, and generating a control section that causes a selected one of said plurality of sections to be called during execution of said object code in accordance with an executing processor's processor type.

16. The machine-readable medium of claim 15, wherein the plurality of instructions for implementing a function for identifying comprises a plurality of instructions for implementing a function for identifying a plurality of code segments each having a same name and each being customized to a different one of the plurality of different processor types.

17. The machine-readable medium of claim 15, wherein the plurality of instructions for implementing a function for identifying comprises a plurality of instructions for implementing a function for identifying a code segment associated with a dispatch construct.

18. The machine-readable medium of claim 17, wherein the plurality of instructions for implementing a function for identifying are further for implementing a function for identifying a plurality of additional code segments associated with a plurality of processor-specific constructs corresponding to the dispatch construct.

* * * * *

UNITED STATES PATENT AND TRADEMARK OFFICE
CERTIFICATE OF CORRECTION

PATENT NO. : 6,049,668
DATED : April 11, 2000
INVENTOR(S) : Smith et al.

Page 1 of 1

It is certified that error appears in the above-identified patent and that said Letters Patent is hereby corrected as shown below:

Column 1,
Line 13, delete "Modem" and insert -- Modern --.

Column 3,
Line 23, delete "Modem" and insert -- Modern --.

Column 6,
Line 40, delete "MM" and insert -- MMX --.

Signed and Sealed this

Twenty-fifth Day of December, 2001

Attest:

JAMES E. ROGAN
*Attesting Officer*    *Director of the United States Patent and Trademark Office*